Feb. 17, 1970 C. H. SHELTON 3,496,471

POLARITY REVERSAL PROTECTION FOR TRANSISTOR CIRCUITS

Filed Jan. 25, 1966 2 Sheets-Sheet 1

PRIOR ART

Inventor
CLARENCE H. SHELTON
by, [signature]
[signature]
Attorneys

Inventor
CLARENCE H. SHELTON
by, [signature]
Attorneys

United States Patent Office 3,496,471

Patented Feb. 17, 1970

3,496,471

POLARITY REVERSAL PROTECTION FOR TRANSISTOR CIRCUITS

Clarence H. Shelton, Wayland, Mass., assignor, by mesne assignments, to Kel Corporation, Belmont, Mass., a corporation of Delaware Filed Jan. 25, 1966, Ser. No. 522,879
Int. Cl. H04b *1/04*
U.S. Cl. 325—151 5 Claims

ABSTRACT OF THE DISCLOSURE

A transistor circuit is shown having a first load in its emitter-collector path and a second load in its emitter-base path, with DC supply terminals at its emitter and in common to the two loads. The second load draws smaller current than the first; a switch in series with the smaller current load controls current in both loads by controlling base bias.

This invention relates to battery operated transistor circuits and in particular to the use of a series transistor for protection against battery polarity reversal.

Portable transistor devices such as radios and transceivers are being made in ever increasingly compact size. Printed circuits are conventional and monolithic circuits are slowly coming into common use. Repair of such circuits is difficult and some times impossible. In the use of transceivers having RF outputs of several hundred milliwatts and up, exact frequency control is critical both in the interest of optimum operation and compliance with FCC rules. One of the steps which is frequently taken to promote frequency stability is complete potting of all electrical components in an epoxy compound. This not only prevents any slight movement of circuit elements or leads that could vary frequency characteristics, but also supplies excellent protection against damage from physical sources.

In transistorized devices of this type it is extremely important to provide protection to the electrical components against such things as short circuits, overloads, and the improper application of voltage at externally available connection points. Due to the near symmetry of a large number of the commercially available batteries, accidental reversal of battery polarity is a common occurrence. Most battery operated circuits are accordingly designed to prevent damage from such polarity reversal. A series diode is one of the more simple devices commonly employed for protection of this type. One of the disadvantages of the series diode is a voltage drop usually of one half volt or more. In portable equipment, battery voltages are preferably kept low and the loss of some of the voltage, as across a protective diode, is undesirable.

Now in accordance with the present invention it has been found that a series transistor, connected with its emitter to one side of a battery and its base and collector electrodes connected through first and second loads respectively to the other side of the battery, can be operated to protect against polarity reversal with a significant reduction in the voltage loss to the load in series with the emitter-collector circuit. Thus it is an object of the present invention to define novel polarity reversal protection for transistor circuits.

It is a further object of the present invention to define a radio transmitter in which current through the emitter-collector circuit of a series transistor operates the power amplifier and current through the emitter-base electrodes of the series transistor operates the master oscillator and modulator.

It is a further object of the present invention to define a battery operated transistor circuit having relatively large and small load portions with the operative current for the large load portion supplied through the collector-emitter circuit of a series transistor and the current for the small load is supplied through the base-emitter circuit of the same transistor. Whereby an open connection to the small load circuit effectively disconnects said large load circuit from the battery.

Further objects and features of the present invention will become apparent upon reading the following specification together with the drawings in which.

Figure 1:
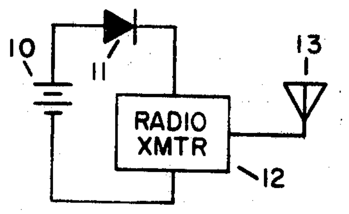
FIG. 1 is a schematic illustration of a prior art polarity reversal protective device.

FIG. 1 illustrates a prior art battery operated transmitter in which a semiconductor 11 connected in series between battery 10 and the transmitter 12 blocks battery current if the battery polarity is accidentally reversed.

Figure 2:
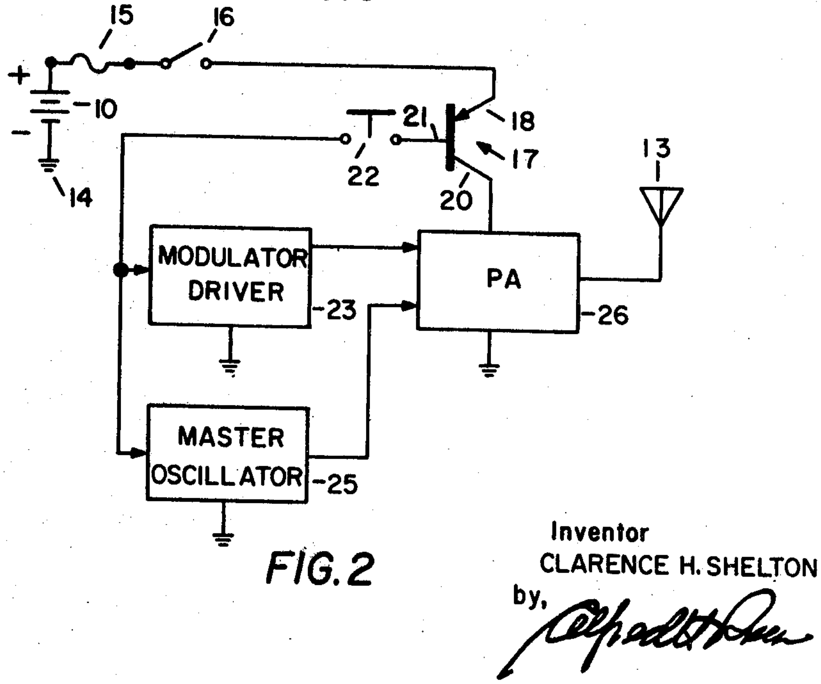
FIG. 2 is a block diagram, partially schematic, depicting a radio transmitter using the invention.

FIG. 2 illustrates a battery operated transmitter in greater detail in accordance with the present invention. The battery 10 is shown with its negative terminal to ground reference 14, positive terminal connected to fuse 15, and an on-off switch 16. The on-off switch in turn is connected to the emitter-electrode 18 of transistor 17. Transistor 17 should have reverse breakdown voltage between any two electrodes exceeding the total voltage of battery 10. Thus if battery 10 has a voltage of 12 volts the reverse breakdown voltage between any two electrodes of transistor 17 is desirably at least about 15 volts. Transistor 17 should also have a very low collector-emitter saturation voltage. Germanium alloy transistors have found highly suitable for this purpose. Typically, collector-emitter saturation voltages can be obtained less than .1 volt and commonly as low as .05 of a volt.

The base electrode 21 of transistor 17 is connected through a push-to-talk switch 22 to a modulator-driver 23 and a master oscillator 25. These are conventional transistorized transmitter circuits and are not illustrated in detail.

Figure 3:
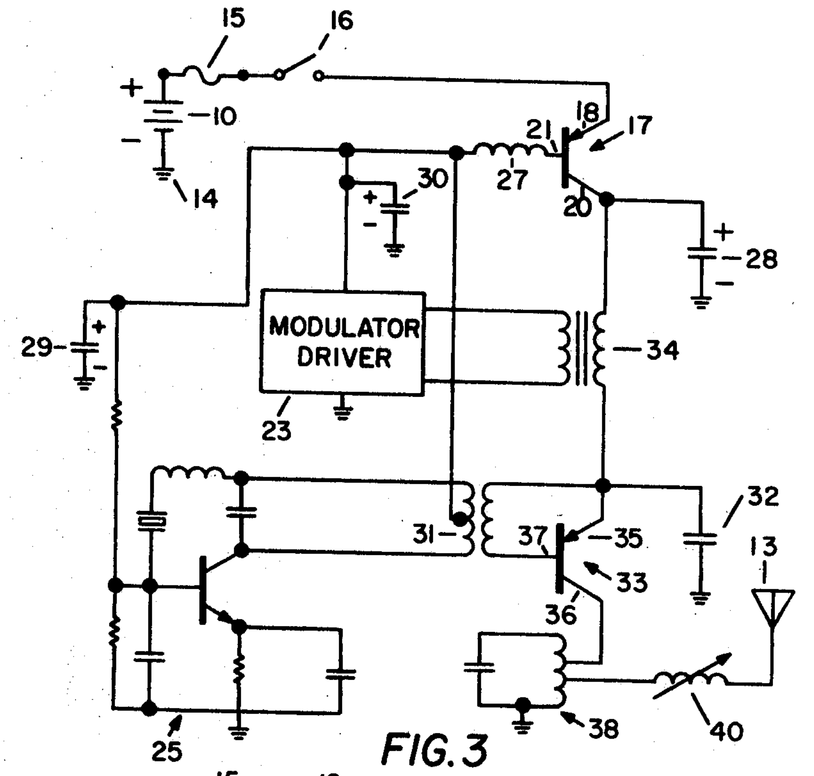
FIG. 3 is a schematic of the second embodiment of a radio transmitter utilizing the invention.

Modulator-driver 23 and oscillator 25 are connected back to the negative terminal of battery 10 through reference connection 14 and are also each connected into a power amplifier 26 as is depicted in greater detail in FIG. 3. Collector electrode 20 of transistor 17 is connected to power amplifier 26 which in turn is connected to the negative terminal of battery 10 through reference 14. The output of power amplifier 26 drives an antenna 13.

The operation of the transmitter of FIG. 2 is commenced by closing of switch 16, this applies the battery voltage to emitter 18 of transistor 17. At this point transistor 17 appears as an open circuit and substantially no current flows through the loads. Open switch 22 prevents forward biasing of the emitter-base junction effectively blocking the current flow. To insure that no forward bias is applied to the base-emitter junction when switch 22 is open a resistive connection can be made between the base and emitter electrodes.

When push-to-talk switch 22 is closed, current is drawn through the base-emitter junction operating modulator-driver 23 and oscillator 25. This current flow also forward biases the base-emitter junction allowing current to flow to power amplifier 26 through the emitter-collector of transistor 17. In a transmitter, the power amplifier current is usually several times the current used in the modulator-driver and oscillator stages. Also it is in the power amplifier section that the maximum available voltage is the most desirable.

With a transistor 17 having a beta of about 10, current flow to the power amplifier stage can readily be about 10 times the current flow to the modulator-driver and master oscillator stages combined. At the same time while the voltage drop across the emitter-base junction will be in the vicinity of .5 volt, the voltage drop across the emitter-collector of the transistor can readily be in the vicinity of .05 volt providing nearly full battery voltage to power amplifier 26. It will be seen that the current drawn by the modulator-driver and oscillator stages must be at least adequate to cause saturation of transistor 17. Release of the push-to-talk switch 22 will automatically cut off current flow to all stages. One of the advantages of this arrangement is that the current flow through push-to-talk switch 22 is substantially less than would be the case if this switch were directly in the main supply line in series with switch 16.

It is also worth noting that the battery current used for control of transistor 17 is not wasted in a purely dissipative load but is fully utilized as the operative current in the modulator-driver and oscillator stages.

Referring now to FIG. 3, a circuit in greater schematic detail is depicted that is very similar to the circuit of FIG. 2. FIG. 3 shows a typical transistorized power amplifier using a transistor 33 as a power amplifier stage which is driven at a carrier wave frequency through a transformer 31 coupling the power amplifier to crystal-controlled oscillator 25. While crystal-controlled oscillator 25 is illustrated in detail, it is a conventional oscillator circuit and the separate parts are not called-out for descriptive purposes.

Power amplifier transistor 33 is also modulated through a transformer 34 coupling the output from modulator-driver 23. The emitter 35 of transistor 33 is connected through the secondary windings of modulator-transformer 35 to the collector of protective transistor 17. Collector 36 of transistor 33 is returned to reference 14 through inductor windings in resonant tank circuit 38 supplying antenna 13 through loading coil 40.

Following this circuit from the positive terminal of battery 10 through fuse 15, switch 16, transistor 17, the secondary of transformer 34, transistor 33, and tank circuit 38, it will be observed that there are no DC impedance elements utilized. This again is quite conventional and desirable in radio transmitter power amplifier stages. But when the battery polarity is reversed this lack of DC resistance means that the full battery voltage falls directly across the collector-emitter circuit of transistor 33 except for the protection afforded by transistor 17. When a transistor connector in the manner of transistor 33 is subjected to a reversal of source polarity, it will normally be destroyed by excessive current flow. Referring to FIG. 3, assume that the battery polarity is reversed in the absence of a protective transistor. The collector-base junction (36–37) is biased strongly forward by the low resistance path through the secondary of transformer 31 to emitter 35. This causes the transistor to conduct heavily in the reverse direction with collector 36 acting as the emitter. Heavy current quickly damages the transistor.

In addition to this, in compact circuits it is necessary to use electrolytic decoupling capacitors to avoid undesirable coupling of audio frequency modulation between stages. Such decoupling capacitors are illustrated as capacitor 28 in the power amplifier section, capacitor 29 for the oscillator, and capacitor 30 for the modulator-driver. Among the more minaturized electrolytic capacitors, tantalum capacitors are currently in the greatest commercial use. These tantalum capacitors generally have reverse breakdown voltages in the vicinity of about 2 volts. In the absence of protection, a reversal of battery polarity will result in a dead-short circuit through these capacitors with consequent damage to the capacitors and loss of battery charge.

In operation assume that the polarity of battery 10 has been accidentally reversed, collector 20 of transistor 17 will now try to act as an emitter, however, base electrode 21 now goes through RF choke 27 and the resistor network of oscillator 25 through reference 14 to the now positive terminal of battery 10. Collector 20 now trying to act as an emitter is connected down through transistor 33 and tank circuit 38 to the same reference point 14 so that base electrode 21 is effectively tied to the same voltage as collector 20 preventing forward biasing of the collector-base junction so that transistor 17 cannot operate in the reverse direction. It will be seen that a negative voltage applied to emitter 18 automatically reverse biases the emitter-base junction so that current flow is blocked in all directions.

Figure 4:
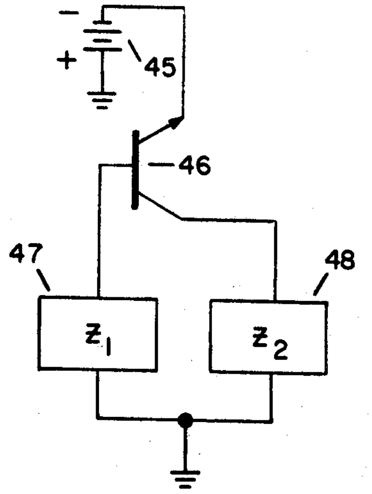
FIG. 4 is a simplified diagram of the inventive protective device.
Figure 5:
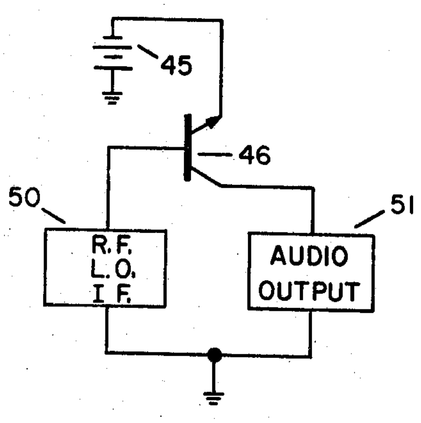
FIG. 5 is a block diagram, partially schematic, illustrating a further embodiment of the invention.

FIGS. 2 and 3 have shown transistor 17 as a PNP transistor. In FIGS. 4 and 5 the protective transistor is shown as a NPN transistor 46 with all polarity reversed including the polarity of battery 45.

The inventive concept is shown by simplified diagram in FIG. 4. Battery 45 has its negative terminal connected to the emitter of transistor 46. The base electrode of transistor 46 is connected through a first eimpedance 47 and through a reference connection to the positive terminal of battery 45. The collector of transistor 46 is connected through a second load impedance 48 and reference also to the positive terminal of battery 45. Load 48 in accordance with the invention draws greater current than load 47. Load 48 is always an operative load such as a power amplifier stage in a transmitter or audio amplifier. Relatively smaller load 47 can be lower current handling stages in load 48 or load 47 can be merely a dissipative load for controlling protective transistor 46.

FIG. 5 is essentially identical to FIG. 4 but illustrating particular use of the protective circuit in a radio receiver. The relatively smaller load in the base circuit of transistor 46 is depicted by a block diagram 50 as comprising the RF, local oscillator (or converter), and IF stages of the radio receiver. The larger load in the collector circuit of transistor 46 is depicted by block 51 as the audio output section requiring the majority of current flow.

While the invention has been described in relation to specific embodiments in which it has been found particularly advantageous, it is not intended that it is limited thereto, it can be used in non-battery operated circuits where there is some danger of a polarity reversal and in various situations in which power to a high power consumption section of equipment is desirably controlled by the application of power to a relatively low power consumption section of equipment. Depending on the selection of the particular solid state components the current and voltage handling capabilities can vary over a wide range. Thus it is intended to cover the invention broadly within the spirit and scope of the appended claims.

I claim:

1. In a battery operated transistorized radio transmitter comprising a modulator-driven, an oscillator, a power amplifier, an antenna and battery connecting circuitry for protecting said transmitter against accidental reversal of battery polarity; the combination in said connecting circuitry comprising:

(a) a saturable transistor having an emitter electrode, a base electrode, and a collector electrode;

(b) a connection between said battery and said emitter electrode;

(c) a connection between said collector electrode and said power amplifier;

(d) a connection betwen said base electrode and both said modulator-driver and said oscillator in common;

(e) a return from said modulator-driver, said oscillator, and said power amplifier all to a single terminal of said battery, said transistor having an emitter-collector saturation voltage of less than .1 volt and a reverse breakdown voltage between any two electrodes exceeding the total operating battery voltage whereby current drawn through the emitter-base junction of said transistor by said modulator-driver and said oscillator cause said transistor to saturate providing within .1 volt of full battery voltage across said power amplifier and an effectively open circuit upon accidental reversal of battery polarity.

2. In a battery operated radio transmitter according to claim 1, the combination in which said transistor is a germanium alloy junction transistor.

3. In a battery operated radio transmitter according to claim 1, the combination in which a direct current path exists through said power amplifier between the collector of said transistor and said battery consisting only of active semiconductor elements and inductive windings.

4. In a battery operated radio transmitter according to claim 3, the combination in which all electrical components except batteries, manual controls and wave transducers are immovably embedded in a potting compound.

5. A radio receiver comprising:

(a) a first section including radio frequency, converter, and intermediate frequency stages;

(b) a second section including audio output stages;

(c) a first battery terminal;

(d) a second battery terminal connected to a reference point;

(e) means to connect said first section and said second section to said reference point;

(f) a transistor having an emitter electrode, a base electrode, and a collector electrode;

(g) a connection between said emitter electrode and said first battery terminal;

(h) a connection between said base electrode and said first section; and, (i) a connection between said collector electrode and said second section, whereby current flowing from said first battery terminal through the emitter-base junction of said transistor, said first section and back to the second battery terminal through said reference point, biases said transistor to saturation providing substantially full battery voltage to said second section.

References Cited

UNITED STATES PATENTS

| | | | |
|---|---|---|---|
| 2,884,518 | 4/1959 | O'Neill | 325—492 |
| 3,068,415 | 12/1962 | Johnson | 325—185 X |
| 3,258,672 | 6/1966 | Godshalk et al. | 320—25 |
| 3,285,234 | 11/1966 | McLaughlin | 307—88.5 X |

ROBERT L. GRIFFIN, Primary Examiner

B. V. SAFOUREK, Assistant Examiner

U.S. Cl. X.R.

307—202; 320—25; 325—186, 362, 492